US012565279B1

(12) United States Patent
Shi

(10) Patent No.: US 12,565,279 B1
(45) Date of Patent: Mar. 3, 2026

(54) MULTI-FUNCTION FOLDING BIKE

(71) Applicant: Baifeng Shi, Ningbo (CN)

(72) Inventor: Baifeng Shi, Ningbo (CN)

(*) Notice: Subject to any disclaimer, the term of this patent is extended or adjusted under 35 U.S.C. 154(b) by 0 days.

(21) Appl. No.: 19/277,452

(22) Filed: Jul. 23, 2025

(51) Int. Cl.
B62K 9/00 (2006.01)
B62K 15/00 (2006.01)

(52) U.S. Cl.
CPC .............. B62K 9/00 (2013.01); B62K 15/006 (2013.01)

(58) Field of Classification Search
CPC ............. B62K 15/00; B62K 9/00; B62H 1/12
USPC .......................................................... 280/270
See application file for complete search history.

(56) References Cited

U.S. PATENT DOCUMENTS 4,842,292 A * 6/1989 Wang ................... B62K 15/008
280/30
5,002,296 A * 3/1991 Chiu ..................... B62M 11/02
74/67

11,242,114 B2 * 2/2022 Chen ...................... B62K 19/34
2011/0057484 A1 * 3/2011 Staudinger ............. A47D 1/106
297/134
2014/0076649 A1 * 3/2014 Kim .......................... B62K 3/10
280/287
2019/0382071 A1 * 12/2019 Jablonski ................ B62H 7/00

* cited by examiner

*Primary Examiner* — Valentin Neacsu
*Assistant Examiner* — Hosam Shabara

(57) ABSTRACT

The present invention discloses a multi-function folding bike pertaining to the field of bicycles. The bike comprises a main frame, an actuation button, a gear assembly, and an expansion unit. The expansion unit includes a training wheel, a pedal assembly, and a kickstand, wherein cooperative interaction of these components enables multiple configuration transformations to satisfy diverse functional riding requirements. Through selective combinations of elements within the expansion unit, the bike achieves morphological adaptations for: children's progressive riding skill development, cargo transportation capability, and personalized riding experiences, thereby accommodating evolving needs across different growth stages while significantly enhancing applicability and utility of the bicycle.

7 Claims, 5 Drawing Sheets

1

2

MULTI-FUNCTION FOLDING BIKE

FIELD

The present invention relates to the field of bicycle technology, specifically a multi-function folding bike.

BACKGROUND

During children's growth, bicycles serve as important tools to help them develop balance, coordination, and leg strength while enjoying outdoor activities. However, traditional children's bicycles have obvious limitations in design, with relatively single functions that cannot meet the diverse needs of children at different growth stages.

Traditional children's bicycles typically have only one fixed form, making them difficult for younger children who are not yet capable of riding independently. These children may lack sufficient balance and leg strength to control the bicycle, and traditional bicycles lack auxiliary designs to facilitate effective practice and adaptation. Moreover, as children grow older and their skills improve, their functional requirements for bicycles also change. For example, transitioning from needing auxiliary balance training to independent riding, traditional bicycles cannot adjust their forms or functions according to children's actual needs. This forces parents to frequently replace bicycles of different types and sizes, increasing financial burdens and wasting resources. Additionally, during the process of learning to ride, children often require a gradual adaptation phase. Traditional bicycles cannot provide multiple transitional forms, potentially causing more frustration and difficulties during the learning process, which may dampen their enthusiasm and confidence in learning to ride.

In summary, the single-function limitation of traditional children's bicycles restricts their effective use during children's growth and fails to provide a comprehensive and progressive riding experience. Therefore, developing a bicycle capable of transforming into multiple forms to meet children's needs at different growth stages holds significant practical importance.

SUMMARY

To address the shortcomings of existing technology, the present invention provides a multi-function folding bike, solving the problem of traditional children's bicycles having only a fixed form, which limits their functionality and effective use during children's growth, and fails to provide a comprehensive and progressive riding experience.

To achieve the above objectives, the present invention adopts the following technical solution: a multi-function folding bike includes a main frame, which is equipped with an expansion unit. The installation of the expansion unit enables the main frame to transform into multiple forms.

The expansion unit includes at least one training wheel mounted to a rear portion of the main frame. Cooperation between the main frame and training wheel establishes a balance training bike configuration.

The training wheel includes a support frame disposed at an interior side thereof, having: a first end pivotally coupled to the training wheel; and a second end detachably secured to the rear portion of the main frame.

The expansion unit includes: at least one training wheel mounted to the rear portion; and a pedal assembly mounted to a central portion of the main frame, wherein the components cooperatively form an assisted-riding bicycle configuration.

The pedal assembly includes a crank arm disposed at an interior side thereof, having a first end rotatably coupled to the pedal assembly.

The crank arm includes a second end detachably secured to the central portion of the main frame.

The expansion unit includes: a pedal assembly mounted to the central portion; and a kickstand pivotally mounted to a first lateral side of the rear portion, wherein the components establish a standard bicycle configuration; an upper mounting end of the kickstand being detachably secured to the first lateral side.

The main frame includes: an actuation button (5) disposed at a base portion; and a locking assembly operatively connected to the button (5), wherein the button (5) releases the locking assembly to enable folding of the main frame.

A drive mechanism includes: a gear assembly (6) disposed between the pedal assembly (3) and a rear wheel of the main frame (1);

The gear assembly (6) comprising: multiple intermeshing gear sets arranged in parallel; bearing elements rotatably supporting the gear sets on the main frame (1); a drive sprocket engaged with a first gear set proximal to the pedal assembly (3); a driven sprocket engaged with a second gear set proximal to the rear wheel; wherein rotational torque from the pedal assembly (3) is transmitted sequentially through the drive sprocket, gear assembly (6), and driven sprocket to propel the rear wheel.

The present invention discloses a multi-function folding bike, which offers the following benefits:

1. The multi-function folding bike is equipped with an expansion unit, enabling the main frame to transform into multiple forms. This allows the bicycle to meet various needs such as children's learning to ride, cargo-carrying rides, and personalized riding experiences. It adapts to children's riding requirements at different growth stages, significantly enhancing the bicycle's applicability and practicality.

2. By installing or removing the telescopic rod on the bicycle in various forms, more bicycle configurations can be achieved, further expanding the bicycle's functionality and meeting more riding experiences.

BRIEF DESCRIPTION OF THE DRAWINGS

To clearly illustrate the embodiments of the present invention or the technical solutions in existing technology, the following will briefly describe the accompanying drawings used in the embodiments or existing technology. It is evident that the drawings in the following description are merely some embodiments of the present invention. For those skilled in the art, other drawings can be obtained based on these drawings without creative effort.

US 12,565,279 B1

Figure 1:
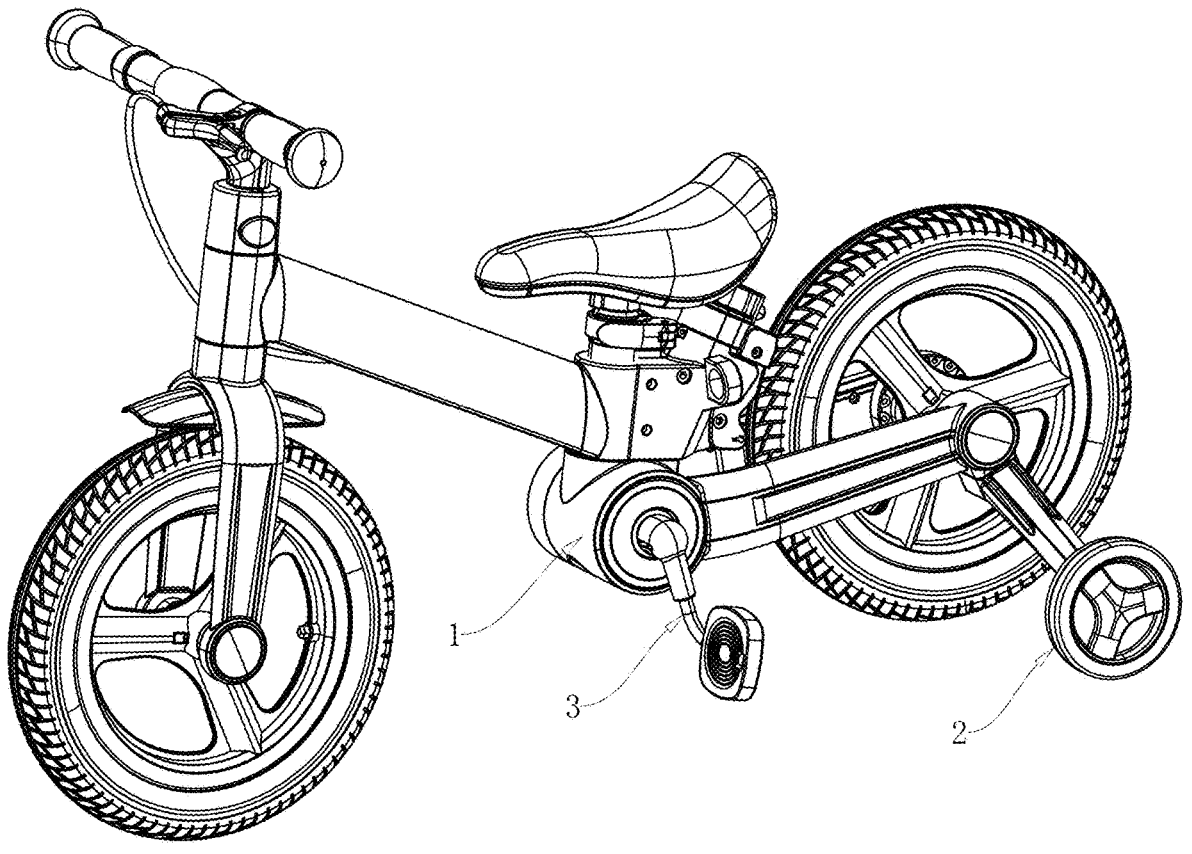
FIG. 1 is a perspective view showing the balance bike configuration of the present invention.

Reference Numerals: 1. Main frame; 2. Auxiliary wheel; 3. Pedal; 4. Kickstand; 5. Button; 7. Gear assembly.

DETAILED DESCRIPTION

To make the objectives, technical solutions, and advantages of the embodiments of the present invention clearer, the technical solutions in the embodiments of the present invention will be clearly and completely described below. It is evident that the described embodiments are only a part of the embodiments of the present invention, not all of them. Based on the embodiments of the present invention, all other embodiments obtained by those skilled in the art without creative effort shall fall within the protection scope of the present invention.

The embodiments of the present invention disclose a multi-function folding bike.

Figure 2:
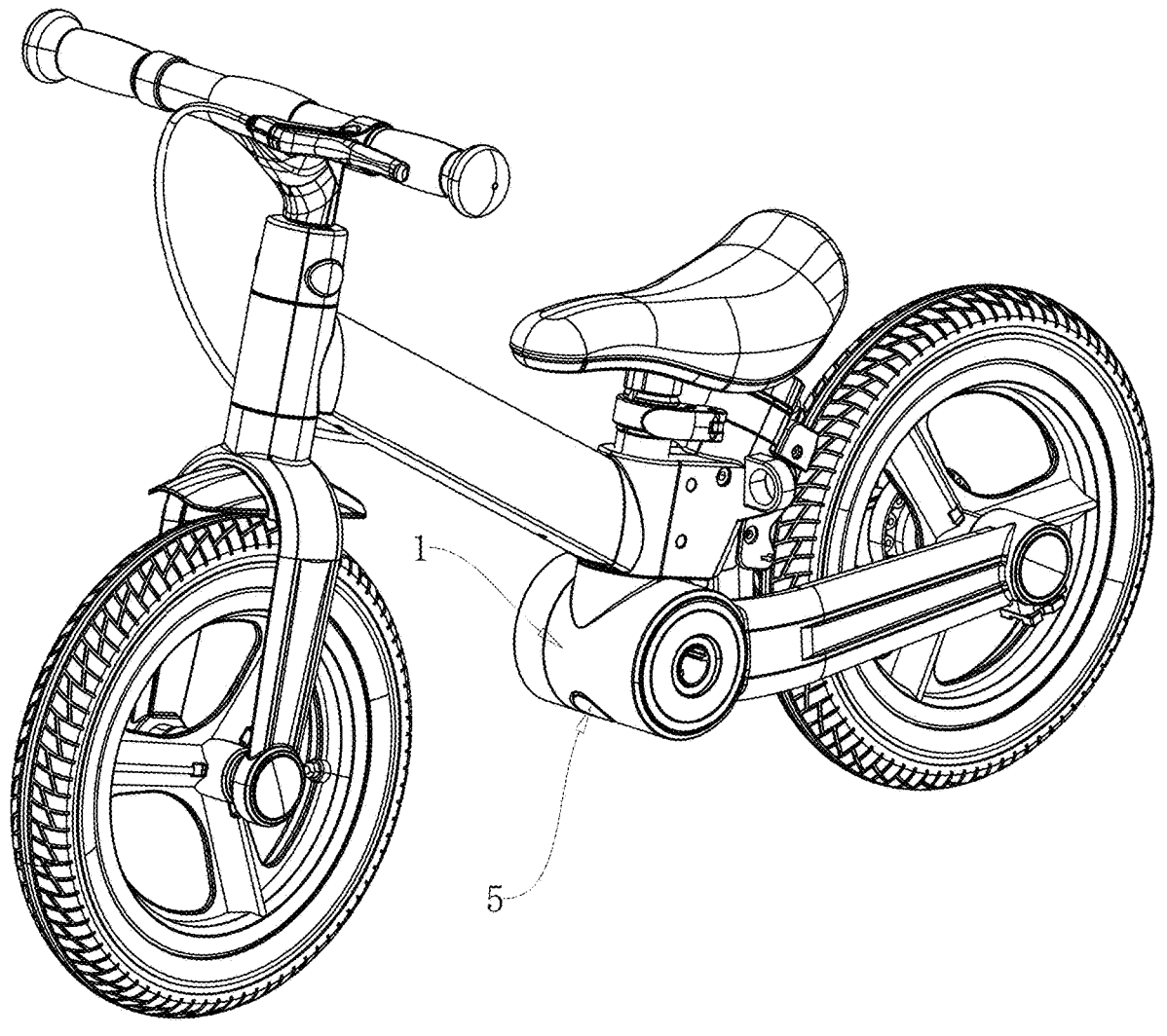
FIG. 2 is a perspective view showing the balance training bike configuration with auxiliary wheels.

Embodiment 1: As shown in FIGS. 1 and 2, the multi-function folding bike includes a main frame (1), which is equipped with an expansion unit. The installation of the expansion unit enables the main frame (1) to transform into multiple forms.

Further, the expansion unit includes an auxiliary wheel (2), which is installed at the rear end of the main frame (1). The cooperation between the main frame (1) and the auxiliary wheel (2) forms a balance training bike configuration.

Further, the inner side of the auxiliary wheel (2) is provided with a support frame. One end of the support frame is rotatably connected to the auxiliary wheel (2), and the other end is detachably attached to the rear end of the main frame (1).

One end of the support frame is rotatably connected to the auxiliary wheel (2), allowing the auxiliary wheel (2) to rotate flexibly during use to adapt to different road conditions and children's movement directions. The other end of the support frame is detachably attached to the rear end of the main frame (1), ensuring stability while facilitating disassembly and installation when needed.

By installing the auxiliary wheel (2), the bicycle can transform into a balance training bike (with auxiliary wheels) configuration, suitable for children with insufficient balance or those learning to walk.

The auxiliary wheel (2) provides stable support for the bicycle, preventing it from tipping over during use. For children with insufficient balance or those learning to walk, the auxiliary wheel (2) offers additional balance assurance, allowing them to move and explore with greater confidence and safety. This configuration also lays the foundation for children's subsequent riding learning, helping them gradually adapt to the bicycle's basic structure and movement.

Figure 3:
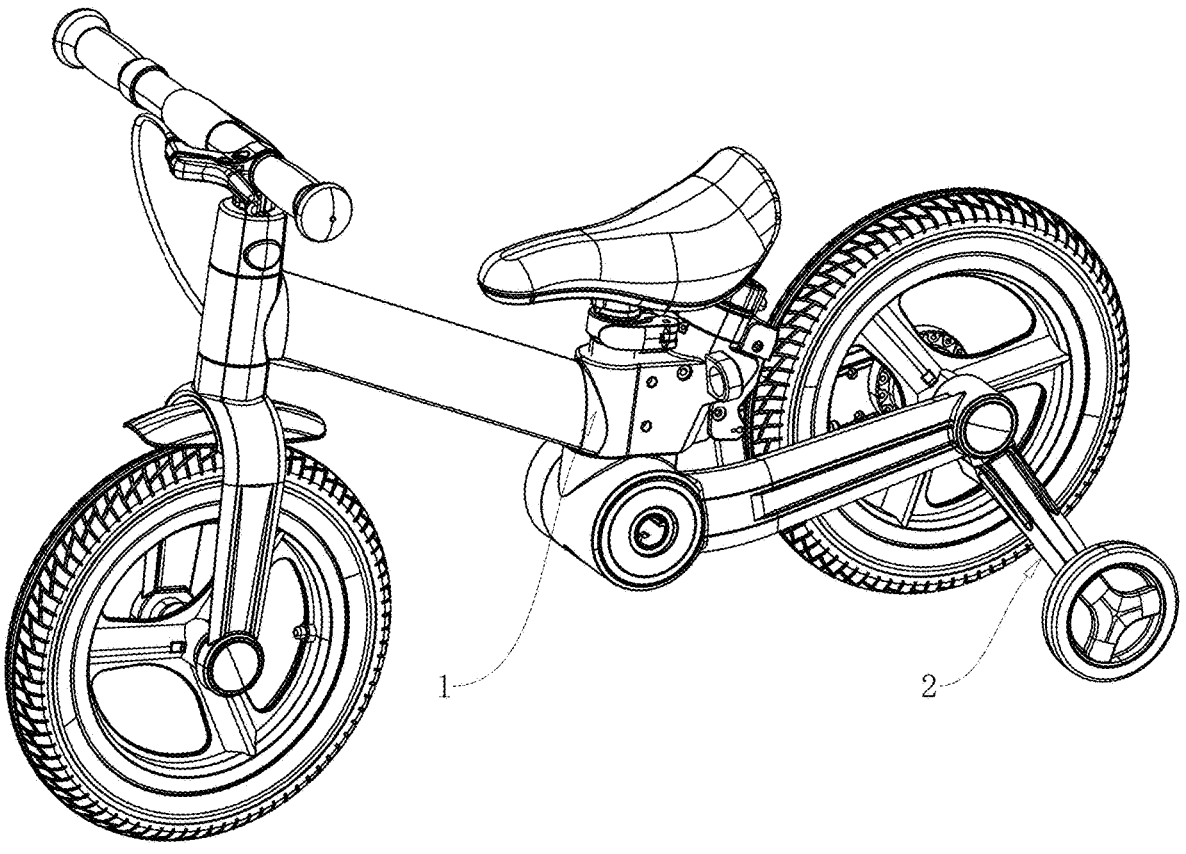
FIG. 3 is a perspective view showing the bicycle configuration with training wheels.

Embodiment 2: As shown in FIGS. 1 and 3, the multi-function folding bike includes a main frame (1), which is equipped with an expansion unit. The installation of the expansion unit enables the main frame (1) to transform into multiple forms.

Further, the expansion unit includes an auxiliary wheel (2) and a pedal (3). The auxiliary wheel (2) is installed at the rear end of the main frame (1), and the pedal (3) is installed at the middle of the main frame (1). The cooperation between the main frame (1), the auxiliary wheel (2), and the pedal (3) forms a bicycle configuration with auxiliary wheels (2).

Further, the inner side of the pedal (3) is provided with a rotating frame. One end of the rotating frame is rotatably connected to the pedal (3), and the other end is detachably attached to the middle of the main frame (1).

One end of the rotating frame is rotatably connected to the pedal (3), allowing the pedal (3) to rotate flexibly according to the child's pedaling motion, providing a comfortable pedaling experience. The other end of the rotating frame is detachably attached to the middle of the main frame (1), ensuring the stability of the pedal (3) during use.

This bicycle configuration with auxiliary wheels (2) is particularly suitable for children with insufficient balance or those learning to ride. The auxiliary wheel (2) plays a crucial role in balancing during riding, helping children maintain the bicycle's stability and significantly reducing the risk of falling. The pedal (3) allows children to start attempting to pedal and drive the bicycle forward. During this process, children can gradually master riding techniques and rhythm, experiencing the joy of riding. This configuration provides a smooth transition from walking to riding, enhancing children's enthusiasm and confidence in learning to ride, allowing them to acquire riding skills in a relaxed and enjoyable atmosphere.

Figure 4:
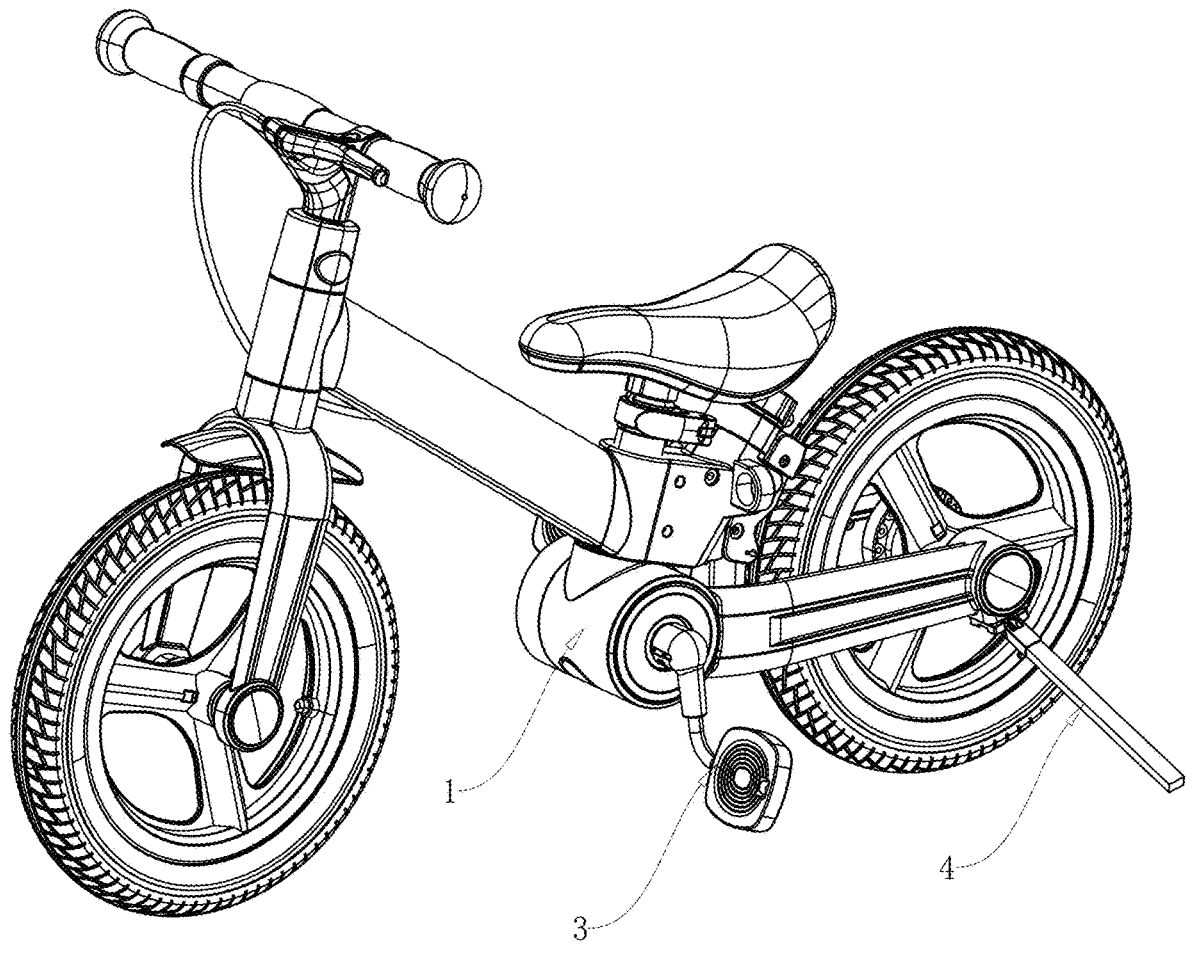
FIG. 4 is a perspective view showing the standard bicycle configuration.

Embodiment 3: As shown in FIGS. 1 and 4, the multi-function folding bike includes a main frame (1), which is equipped with an expansion unit. The installation of the expansion unit enables the main frame (1) to transform into multiple forms.

Further, the expansion unit includes a pedal (3) and a kickstand (4). The pedal (3) is installed at the middle of the main frame (1), and the kickstand (4) is installed on one side of the rear end of the main frame (1). The cooperation between the main frame (1), the pedal (3), and the kickstand (4) forms a standard bicycle configuration.

The upper mounting end of the kickstand (4) is detachably secured to a first lateral side of a rear portion of the main frame (1). The pedal assembly (3) is mounted to a central portion of the main frame (1), providing a pedal-support interface for a child to drive the bicycle. Simultaneously, the kickstand (4) is pivotally mounted to the first lateral side of the rear portion, wherein the kickstand (4) provides a support function to prevent tipping when the bicycle is parked. Cooperative interaction between the main frame (1), pedal assembly (3), and kickstand (4) establishes a standard bicycle configuration.

This standard configuration accommodates children possessing foundational balance abilities and riding proficiency. During operation, the child achieves: enhanced control through the pedal assembly (3) drive mechanism; propulsion via pedaling to experience riding dynamics; and stable parking enabled by the kickstand's (4) support structure.

Embodiment 4: As shown in FIG. 1, the multi-function folding bike includes a main frame (1). After removing all expansion units from the main frame (1), the bicycle transforms into a balance bike configuration. This configuration is suitable for younger children who are not yet capable of riding independently, allowing them to practice gliding with both feet on the ground. During gliding, children can better sense changes in balance and speed, exercising their leg strength and coordination. The balance bike configuration removes redundant components, making the bicycle lighter and easier for children to control. It provides a simple and effective balance training tool, helping them gradually transition to independent riding. While playing with the balance bike, children can not only improve their physical fitness but also cultivate an interest and love for riding.

Embodiment 5: With reference to FIG. 1, the multi-function folding bike comprises a main frame (1) equipped with an expansion unit. Installation of said expansion unit enables multiple configuration transformations of the main frame (1).

A button (5) is integrated into a base portion of the main frame (1), said button (5) being configured to initiate folding of the main frame (1) for storage. Through single-action activation: depression of the button (5) triggers automatic folding/unfolding functionality; eliminates manual adjustment of multiple components; and reduces the bicycle to a compact storage configuration permitting: placement in vehicle trunks, transport in elevators, and storage in confined spaces.

Figure 5:
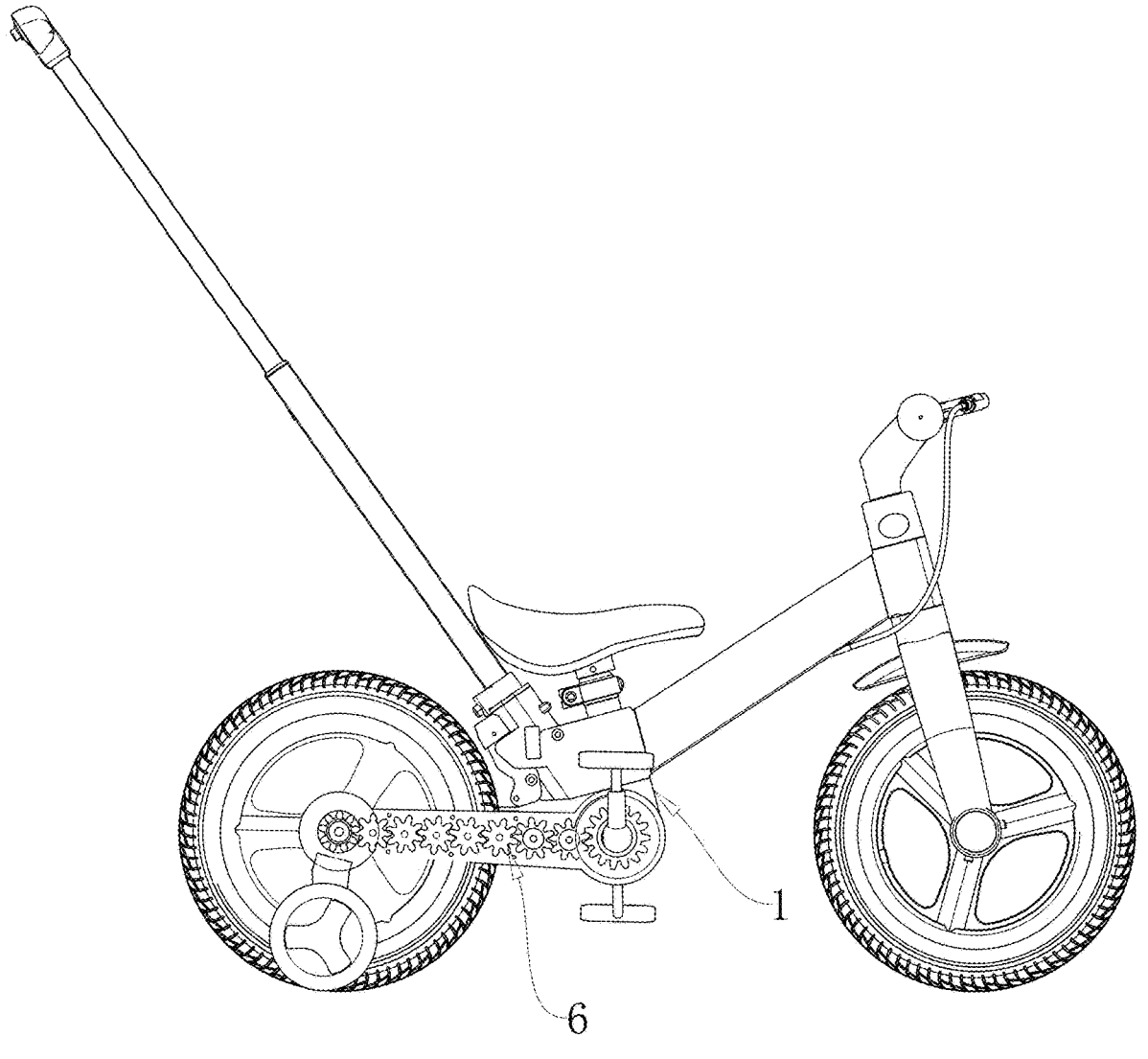
FIG. 5 is a structural diagram of the gear assembly of the present invention.

Embodiment 6: With reference to FIGS. 1 and 5, the multi-function folding bike comprises a main frame (1) equipped with an expansion unit, wherein installation of said expansion unit enables multiple configuration transformations of the main frame (1).

A drive mechanism includes a gear assembly (6) disposed between a pedal assembly (3) and a rear wheel of the main frame (1). The gear assembly (6) comprises: multiple intermeshing gears arranged in parallel; bearing elements rotatably supporting said gears on the main frame (1); a drive sprocket engaged with a first gear proximal to the pedal assembly (3); and a driven sprocket engaged with a second gear proximal to the rear wheel, wherein rotational torque from the pedal assembly (3) is transmitted sequentially through the drive sprocket, gear assembly (6), and driven sprocket to drive the rear wheel. The chainless drive design enables direct power transfer with reduced energy dissipation, while eliminating risks of chain breakage and derailment to mitigate operational failures during riding.

In summary, through the combined use of different structures in the expansion unit, the bicycle can achieve multiple morphological transformations, meeting various needs such as children's walking practice, learning to ride, and personalized riding experiences. It adapts to children's riding requirements at different growth stages, significantly enhancing the bicycle's applicability and practicality.

The above description illustrates the basic principles, main features, and advantages of the present invention. Those skilled in the art should understand that the present invention is not limited to the above embodiments. The embodiments and descriptions are merely illustrative of the principles of the present invention. Without departing from the spirit and scope of the present invention, various changes and improvements can be made, all of which fall within the protection scope of the present invention. The protection scope of the present invention is defined by the appended claims and their equivalents.

The invention claimed is:

1. A multi-function bike comprising: a main frame: a front wheel rotatably coupled to the main frame: a rear wheel rotatably coupled to the main frame: and an expansion unit removably mounted to the main frame, wherein installation or removal of components of the expansion unit is configurable to sequentially establish multiple riding configurations comprising: a balance configuration without pedals or auxiliary wheels a balance-training configuration comprising at least one auxiliary wheel mounted to a rear portion of the main frame: an assisted-riding configuration comprising the auxiliary wheel and a pedal assembly detachably mounted to a central portion of the main frame: and a standard-riding configuration comprising the pedal assembly and a kickstand pivotally mounted to a rear portion of the main frame, wherein the main frame comprises a button disposed at a base portion of the main frame, the button being operatively coupled to a locking assembly to control secure attachment or release of one or more auxiliary components of the expansion unit.

2. The multi-function bike of claim 1, wherein the auxiliary wheel assembly comprises an auxiliary wheel and a support frame disposed on an interior side of the auxiliary wheel, the support frame having a first end pivotally coupled to the auxiliary wheel and a second end detachably secured to a rear portion of the main frame to provide a balance-training configuration.

3. The multi-function bike of claim 1, wherein the pedal assembly comprises a pedal and a rotating frame disposed on an interior side of the pedal, the rotating frame having a first end rotatably coupled to the pedal and a second end detachably secured to a central portion of the main frame to establish an assisted-riding configuration.

4. The multi-function bike of claim 1, wherein the kickstand assembly comprises a kickstand having an upper mounting end detachably secured to a first lateral side of a rear portion of the main frame to establish a standard-riding configuration.

5. The multi-function bike of claim 1, wherein removal of all auxiliary components establishes a balance-bike configuration, installation of only the auxiliary wheel assembly establishes a balance-training configuration, installation of the auxiliary wheel assembly and the pedal assembly establishes an assisted-riding configuration, and installation of the pedal assembly and the kickstand assembly establishes a standard-riding configuration.

6. The multi-function bike of claim 1, further comprising a chainless drive mechanism including a gear assembly disposed between the pedal assembly and the rear wheel of the main frame, the gear assembly comprising multiple intermeshing gears arranged in parallel, bearing elements rotatably supporting the gears on the main frame, a drive sprocket engaged with a first gear proximal to the pedal assembly, and a driven sprocket engaged with a second gear proximal to the rear wheel, wherein rotational torque from the pedal assembly is transmitted sequentially through the drive sprocket, the gear assembly, and the driven sprocket to propel the rear wheel.

7. The multi-function bike of claim 1, wherein the expansion unit comprises at least one auxiliary component selected from an auxiliary wheel assembly, the pedal assembly, and a kickstand assembly.

* * * * *